Aug. 3, 1937.　　　　R. J. WINSTON　　　　2,088,828
LOG SKIDDING AND LOADING HOIST
Filed April 13, 1936　　　3 Sheets-Sheet 1
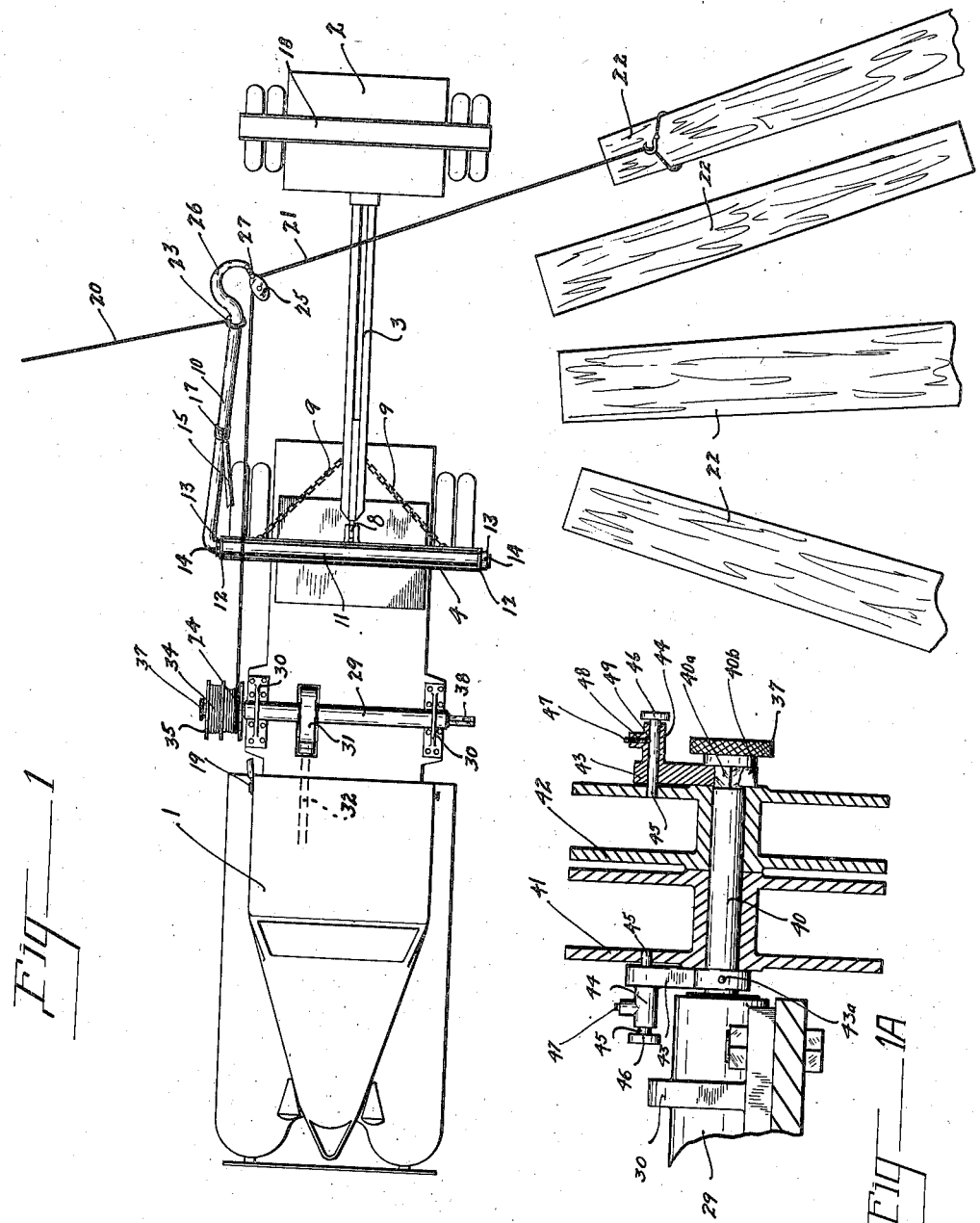
Inventor
Roy J. Winston
By
Attorney

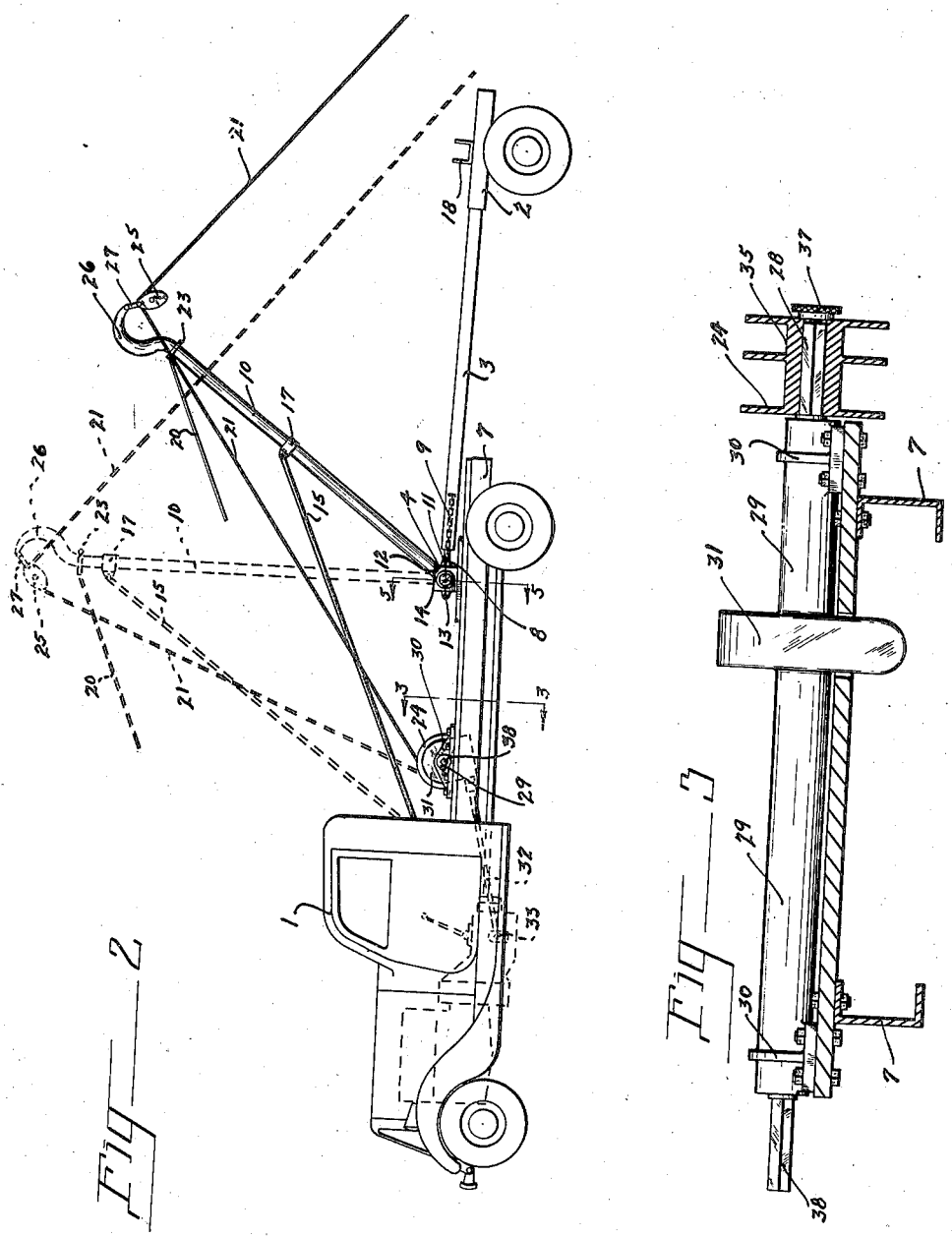

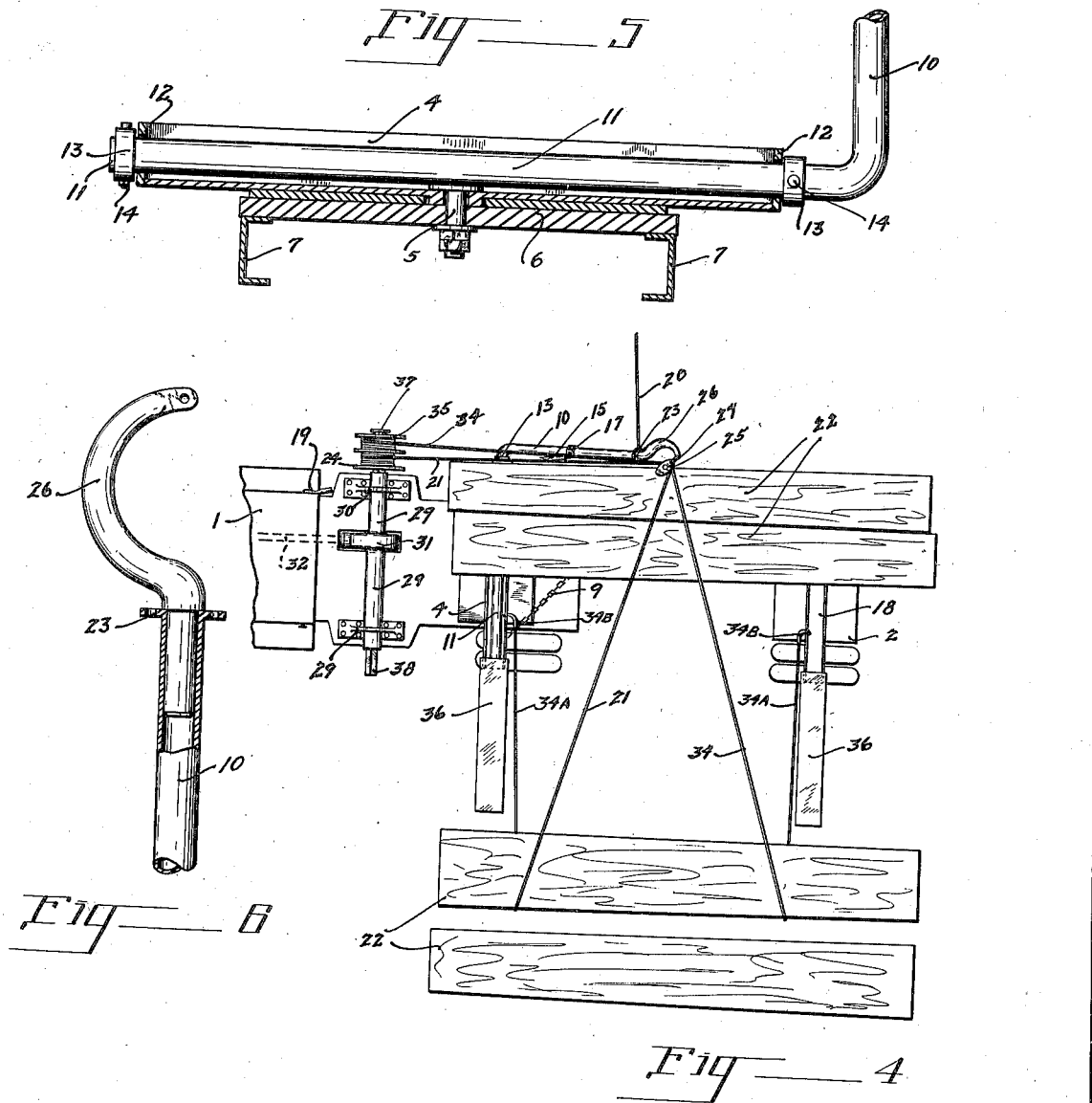

Patented Aug. 3, 1937

2,088,828

UNITED STATES PATENT OFFICE 2,088,828

LOG SKIDDING AND LOADING HOIST

Roy J. Winston, Toledo, Oreg.

Application April 13, 1936, Serial No. 74,054

7 Claims. (Cl. 214—65.3)

This invention relates to loading hoists and is particularly adapted to be used in connection with logging trucks for pulling in logs from distant points to the truck and hoisting the same upon the truck and trailer.

The primary object of the invention is to provide for log loading devices that will work in combination with log hauling trucks and trailers, requiring no other outside mechanism for hauling the logs towards the truck from the surrounding territory, and then hoisting the logs upon the truck and trailer, all by a compact unit mounted upon the truck itself.

Another object of the invention is to provide a hoisting mechanism that can be folded out of the way in transportation without removing the same from the truck.

A still further object of the invention is to provide hoisting drums that can be driven from the power take-off provided on all trucks.

These and other incidental objects will be apparent in the following specification and claims.

Figure 1 is a plan view of a logging truck and trailer, having my new and improved hoisting mechanism in combination therewith. In this view the logs are being skidded towards the truck from the surrounding territory prior to loading.

Figure 1A is a sectional view of another preferred form of the hoisting drum.

Figure 2 is a side elevation of the truck and trailer shown in Figure 1.

Figure 3 is a detailed fragmentary view of the hoisting drum taken on line 3—3 of Figure 2, looking in the direction indicated.

Figure 4 is a fragmentary plan view of the truck and trailer illustrating the hoisting mechanism hoisting the logs upon the truck and trailer.

Figure 5 is a sectional view of the mechanism employed for mounting and pivotally supporting the hoisting boom.

Figure 6 is a fragmentary detailed view of the goose-neck employed at the upper end of the boom for securing the cable block.

In the drawings: The conventional truck is shown at 1, having the usual trailer 2 connected thereto by the tongue 3. A log supporting bunk 4 is pivotally mounted by the king-pin 5 to the base plate 6 mounted upon the frame of the truck 7. The tongue 3 of the trailer is pivotally mounted to the bunk 4 at 8, having chains 9 for holding the bunk 4 in line with the trailer movement so that the logs will lie upon the bunk without twisting. A hoisting boom 10, having its lower ends turned at right angles forming the portion 11 is journaled within the bearings 12 of the bunk 4. Suitable retaining collars 13 are fixedly mounted to the portion 11 of the boom by the bolts 14 for holding the boom in hinged relation to the bunk 4. The boom is held in any position in relation to the vertical position in a direction parallel to the axis of the truck and the trailer by the supporting brace 15. This brace is fixed to the boom through the medium of the collar, 17, while the other end is secured to the fastening means 19 on the truck. A guy wire 20 may be secured to any anchorage at a distant point from the truck for guying or holding the boom against the action of the cable 21 pulling the logs 22 from any distant point towards the truck. The guy wire 20 is secured to the collar 23 of the boom. The cable 21 is trained about the drum 24 and threaded through the block 25 which is secured to the goose-neck 26 by clevis 27. The goose-neck 26 is pivotally mounted within the upper end of the boom 10 so that it may swivel therein. The drum 24 is driven by the shaft 28 within the housing 29. The housing 29 is mounted by brackets 30 to the truck. A worm housing 31 contains a worm wheel and a worm for driving the shaft 28. Dotted position shows a propeller shaft 32 which leads to the transmission power take off 33 of the motor of the truck. I do not want to be limited to this type of hoist as any suitable hoist may be used.

When the truck reaches the vicinity of the logs, the logs may be at a distant point from where the truck is about to be loaded. The cable 21 is taken to the point where the logs are located, and anchored to the log, the drum 24 then pulls the log toward the truck as shown in Figure 1. When sufficient logs have been skidded to the truck, they are ready to be loaded upon the truck and trailer.

Referring to Figure 4, an additional cable 34 trained about the drum 35 and threaded through the block 25 is provided. The cable 21 is wrapped about one end of the log while the cable 34 is wrapped about the opposite end of the log. Their ends 34A have hooks 34B anchored to either the bunks 4 and 18 or to the already loaded logs. Skids 36 are provided for rolling the logs up on the bunks 4 and 18. The boom 10 is mounted on the side of the truck, as illustrated, so that the logs can be loaded on the bunks without any interference. The drums 24 and 35 are also mounted towards one side of the truck so as to be in line with the block 25.

In case that it is desired to load from the opposite side of the truck, the bunk 4 may be revolved on its pivot pin 5 bringing the boom 10 on the opposite side of the truck. In order to transfer the drums 24 and 35, the nut 27 is removed from the end of the shaft 28 allowing the drums 24 and 35 to be removed and placed on the opposite end 38 of the shaft 28.

Referring to Figure 1A which shows a modified drum structure. In this instance a round shaft 40 is used with a squared end portion 40a. Upon this shaft and loosely with regard thereto are mounted the drums 41 and 42. At each end of the drums is an arm 43 having a boss 44 in which is slidably mounted a catch 45 having a manipulating head 46. This catch registers with one or more apertures in the sides of the drums, and when inserted in such apertures causes such drums to rotate with the shaft, and when removed therefrom permits the shaft to rotate freely of the drums or vice versa. Screws 47, engage springs 48 and balls 49 which in turn, engage the catches and can be threaded down to hold the catches in either seated or unseated positions relative to the apertures in the drums. One arm is keyed to the shaft 40 at 43a, while the other arm is provided with a squared portion 40b for detaching it from the end portion 40a of the shaft 40.

From the foregoing it can be readily understood that no outside equipment is necessary and that the mechanism used with my invention is of a simple nature, and I do not wish to be limited to this particular embodiment of this invention as shown, as the mechanism may be slightly modified still coming within the scope of the claims which follow.

Having described my invention, I claim—

1. A log skidding and loading hoist, in combination with a log trailer and a truck provided with a pivoted bunk, a boom pivotally mounted to the bunk and positionable in varying positions between horizontal and vertical positions, a swiveled gooseneck at the free end of the boom having a swivel connection therewith, a block attached to the gooseneck, cables passing through the block and employed for yarding and loading logs, and means upon which the cables wind and unwind.

2. The invention set forth in claim 1 in which the last mentioned means comprise a driven shaft, and a pair of drums.

3. The invention set forth in claim 1 in which the last mentioned means comprise a shaft and a pair of drums mountable to either end of the shaft.

4. The invention as set forth in claim 1 in which the last mentioned means comprise a shaft and drums freely mountable upon either end of the shaft, and means for securing either drum rigidly to such shaft.

5. A log skidding and loading hoist, including a truck, a trailer having swinging connection with the truck, a bunk mounted on and for relative swinging movement with respect to the truck, means for maintaining a relatively fixed relation between the bunk and trailer to permit utilization of the bunk and trailer as log supporting elements, a boom having a lateral end portion supported for rotative movement in the bunk, means for holding the boom at a desired inclination relative to the bunk and trailer, and a hauling cable led through and guided by the free end of the boom.

6. A construction as defined in claim 5, wherein the boom is of a length exceeding the width of the truck body and wherein the lateral end of the boom is of the full length of the bunk.

7. A construction as defined in claim 5, wherein the lateral end of the boom is mounted in the bunk below the upper surface of the latter and wherein means are provided for engaging the terminals of the lateral end of the boom to prevent endwise movement thereof in the bunk.

ROY J. WINSTON.